(12) United States Patent
Wagner

(10) Patent No.: US 10,162,688 B2
(45) Date of Patent: *Dec. 25, 2018

(54) PROCESSING EVENT MESSAGES FOR USER REQUESTS TO EXECUTE PROGRAM CODE

(71) Applicant: Amazon Technologies, Inc., Seattle, WA (US)

(72) Inventor: Timothy Allen Wagner, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/340,825

(22) Filed: Nov. 1, 2016

(65) Prior Publication Data

US 2017/0116051 A1 Apr. 27, 2017

Related U.S. Application Data

(63) Continuation of application No. 14/869,886, filed on Sep. 29, 2015, now Pat. No. 9,483,335, which is a
(Continued)

(51) Int. Cl.
G06F 9/455 (2018.01)
G06F 9/54 (2006.01)
G06F 9/50 (2006.01)

(52) U.S. Cl.
CPC .......... *G06F 9/542* (2013.01); *G06F 9/45533* (2013.01); *G06F 9/50* (2013.01); *G06F 9/546* (2013.01)

(58) Field of Classification Search
None
See application file for complete search history.

(56) References Cited

U.S. PATENT DOCUMENTS

| 4,949,254 A | 8/1990 | Shorter |
| 5,283,888 A | 2/1994 | Dao et al. |

(Continued)

FOREIGN PATENT DOCUMENTS

| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet: URL:https://web.archive.org/web/20151207111702/https:/docs.docker.com/engine/reference/run/ [retrieved on Feb. 28, 2017].

(Continued)

*Primary Examiner* — Brian W Wathen
*Assistant Examiner* — Abdou K Seye
(74) *Attorney, Agent, or Firm* — Knobbe, Martens, Olson & Bear, LLP

(57) ABSTRACT

A service manages a plurality of virtual machine instances for low latency execution of user codes. The service can provide the capability to execute user code in response to events triggered on an auxiliary service to provide implicit and automatic rate matching and scaling between events being triggered on the auxiliary service and the corresponding execution of user code on various virtual machine instances. An auxiliary service may be configured as an event triggering service to detect events and generate event messages for execution of the user codes. The service can request, receive, or poll for event messages directly from the auxiliary service or via an intermediary message service. Event messages can be rapidly converted to requests to execute user code on the service. The time from processing the event message to initiating a request to begin code
(Continued)

execution is less than a predetermined duration, for example, 100 ms.

20 Claims, 4 Drawing Sheets

Related U.S. Application Data continuation of application No. 14/502,741, filed on Sep. 30, 2014, now Pat. No. 9,146,764.

(56) References Cited

U.S. PATENT DOCUMENTS

| | | | |
|---|---|---|---|
| 5,970,488 | A | 10/1999 | Crowe et al. |
| 6,385,636 | B1 | 5/2002 | Suzuki |
| 6,463,509 | B1 | 10/2002 | Teoman et al. |
| 6,708,276 | B1 | 3/2004 | Yarsa et al. |
| 7,036,121 | B1 | 4/2006 | Casabona et al. |
| 7,665,090 | B1 | 2/2010 | Tormasov et al. |
| 7,707,579 | B2 | 4/2010 | Rodriguez |
| 7,730,464 | B2 | 6/2010 | Trowbridge |
| 7,774,191 | B2 | 8/2010 | Berkowitz et al. |
| 7,823,186 | B2 | 10/2010 | Pouliot |
| 7,886,021 | B2 | 2/2011 | Scheifler et al. |
| 8,010,990 | B2 | 8/2011 | Ferguson et al. |
| 8,024,564 | B2 | 9/2011 | Bassani et al. |
| 8,046,765 | B2 | 10/2011 | Cherkasova et al. |
| 8,051,180 | B2 | 11/2011 | Mazzaferri et al. |
| 8,051,266 | B2 | 11/2011 | DeVal et al. |
| 8,065,676 | B1 | 11/2011 | Sahai et al. |
| 8,065,682 | B2 | 11/2011 | Baryshnikov et al. |
| 8,095,931 | B1 | 1/2012 | Chen et al. |
| 8,127,284 | B2 | 2/2012 | Meijer et al. |
| 8,146,073 | B2 | 3/2012 | Sinha |
| 8,166,304 | B2 | 4/2012 | Murase et al. |
| 8,171,473 | B2 | 5/2012 | Lavin |
| 8,209,695 | B1 | 6/2012 | Pruyne et al. |
| 8,219,987 | B1 | 7/2012 | Vlaovic et al. |
| 8,321,554 | B2 | 11/2012 | Dickinson |
| 8,321,558 | B1 | 11/2012 | Sirota et al. |
| 8,336,079 | B2 | 12/2012 | Budko et al. |
| 8,429,282 | B1 | 4/2013 | Ahuja |
| 8,448,165 | B1 | 5/2013 | Conover |
| 8,613,070 | B1 | 12/2013 | Borzycki et al. |
| 8,631,130 | B2 | 1/2014 | Jackson |
| 8,677,359 | B1 * | 3/2014 | Cavage ............... G06F 9/5011 718/1 |
| 8,694,996 | B2 | 4/2014 | Cawlfield et al. |
| 8,719,415 | B1 | 5/2014 | Sirota et al. |
| 8,725,702 | B1 | 5/2014 | Raman et al. |
| 8,756,696 | B1 | 6/2014 | Miller |
| 8,769,519 | B2 | 7/2014 | Leitman et al. |
| 8,799,879 | B2 | 8/2014 | Wright et al. |
| 8,806,468 | B2 | 8/2014 | Meijer et al. |
| 8,819,679 | B2 | 8/2014 | Agarwal et al. |
| 8,825,964 | B1 | 9/2014 | Sopka et al. |
| 8,904,008 | B2 | 12/2014 | Calder et al. |
| 8,997,093 | B2 | 3/2015 | Dimitrov |
| 9,027,087 | B2 | 5/2015 | Ishaya et al. |
| 9,038,068 | B2 | 5/2015 | Engle et al. |
| 9,086,897 | B2 | 6/2015 | Oh et al. |
| 9,092,837 | B2 | 7/2015 | Bala et al. |
| 9,110,732 | B1 | 8/2015 | Forschmiedt et al. |
| 9,112,813 | B2 | 8/2015 | Jackson |
| 9,146,764 | B1 | 9/2015 | Wagner |
| 9,183,019 | B2 | 11/2015 | Kruglick |
| 9,208,007 | B2 | 12/2015 | Harper et al. |
| 9,223,561 | B2 | 12/2015 | Orveillon et al. |
| 9,223,966 | B1 | 12/2015 | Satish et al. |
| 9,250,893 | B2 | 2/2016 | Blahaerath et al. |
| 9,298,633 | B1 | 3/2016 | Zhao et al. |
| 9,317,689 | B2 | 4/2016 | Aissi |
| 9,323,556 | B2 | 4/2016 | Wagner |
| 9,361,145 | B1 | 6/2016 | Wilson et al. |
| 9,413,626 | B2 | 8/2016 | Reque et al. |
| 9,436,555 | B2 | 9/2016 | Dornemann et al. |
| 9,461,996 | B2 | 10/2016 | Hayton et al. |
| 9,471,775 | B1 | 10/2016 | Wagner et al. |
| 9,483,335 | B1 | 11/2016 | Wagner et al. |
| 9,489,227 | B2 | 11/2016 | Oh et al. |
| 9,537,788 | B2 | 1/2017 | Reque et al. |
| 9,588,790 | B1 | 3/2017 | Wagner et al. |
| 9,600,312 | B2 | 3/2017 | Wagner et al. |
| 9,652,306 | B1 | 5/2017 | Wagner et al. |
| 9,652,617 | B1 | 5/2017 | Evans et al. |
| 9,661,011 | B1 | 5/2017 | Van Horenbeeck et al. |
| 9,678,773 | B1 | 6/2017 | Wagner et al. |
| 9,678,778 | B1 | 6/2017 | Youseff |
| 9,715,402 | B2 | 7/2017 | Wagner et al. |
| 9,727,725 | B2 | 8/2017 | Wagner et al. |
| 9,733,967 | B2 | 8/2017 | Wagner et al. |
| 9,760,387 | B2 | 9/2017 | Wagner et al. |
| 9,785,476 | B2 | 10/2017 | Wagner et al. |
| 9,811,363 | B1 | 11/2017 | Wagner |
| 9,811,434 | B1 | 11/2017 | Wagner |
| 9,830,175 | B1 | 11/2017 | Wagner |
| 9,830,193 | B1 | 11/2017 | Wagner et al. |
| 9,830,449 | B1 | 11/2017 | Wagner |
| 9,910,713 | B2 | 3/2018 | Wisniewski et al. |
| 9,928,108 | B1 | 3/2018 | Wagner et al. |
| 9,930,103 | B2 | 3/2018 | Thompson |
| 9,952,896 | B2 | 4/2018 | Wagner et al. |
| 2002/0172273 | A1 | 11/2002 | Baker et al. |
| 2003/0071842 | A1 | 4/2003 | King et al. |
| 2003/0084434 | A1 | 5/2003 | Ren |
| 2003/0229794 | A1 | 12/2003 | James, II et al. |
| 2004/0098154 | A1 | 5/2004 | McCarthy |
| 2004/0249947 | A1 | 12/2004 | Novaes et al. |
| 2004/0268358 | A1 | 12/2004 | Darling et al. |
| 2005/0044301 | A1 | 2/2005 | Vasilevsky et al. |
| 2005/0120160 | A1 | 6/2005 | Plouffe et al. |
| 2005/0132167 | A1 | 6/2005 | Longobardi |
| 2005/0132368 | A1 | 6/2005 | Sexton et al. |
| 2005/0193113 | A1 | 9/2005 | Kokusho et al. |
| 2005/0193283 | A1 | 9/2005 | Reinhardt et al. |
| 2005/0257051 | A1 | 11/2005 | Richard |
| 2006/0123066 | A1 | 6/2006 | Jacobs et al. |
| 2006/0129684 | A1 | 6/2006 | Datta |
| 2006/0184669 | A1 | 8/2006 | Vaidyanathan et al. |
| 2006/0200668 | A1 | 9/2006 | Hybre et al. |
| 2006/0212332 | A1 | 9/2006 | Jackson |
| 2006/0242647 | A1 | 10/2006 | Kimbrel et al. |
| 2006/0248195 | A1 | 11/2006 | Toumura et al. |
| 2007/0094396 | A1 | 4/2007 | Takano et al. |
| 2007/0130341 | A1 | 6/2007 | Ma |
| 2007/0255604 | A1 | 11/2007 | Seelig |
| 2008/0028409 | A1 | 1/2008 | Cherkasova et al. |
| 2008/0082977 | A1 | 4/2008 | Araujo et al. |
| 2008/0104247 | A1 | 5/2008 | Venkatakrishnan et al. |
| 2008/0104608 | A1 | 5/2008 | Hyser et al. |
| 2008/0126110 | A1 | 5/2008 | Haeberle et al. |
| 2008/0126486 | A1 | 5/2008 | Heist |
| 2008/0189468 | A1 | 8/2008 | Schmidt et al. |
| 2008/0201711 | A1 | 8/2008 | Amir Husain |
| 2009/0013153 | A1 | 1/2009 | Hilton |
| 2009/0025009 | A1 | 1/2009 | Brunswig et al. |
| 2009/0055810 | A1 | 2/2009 | Kondur |
| 2009/0055829 | A1 | 2/2009 | Gibson |
| 2009/0070355 | A1 | 3/2009 | Cadarette et al. |
| 2009/0077569 | A1 | 3/2009 | Appleton et al. |
| 2009/0125902 | A1 | 5/2009 | Ghosh et al. |
| 2009/0158275 | A1 | 6/2009 | Wang et al. |
| 2009/0193410 | A1 | 7/2009 | Arthursson et al. |
| 2009/0198769 | A1 | 8/2009 | Keller et al. |
| 2009/0204964 | A1 | 8/2009 | Foley et al. |
| 2009/0288084 | A1 | 11/2009 | Astete et al. |
| 2009/0300599 | A1 | 12/2009 | Piotrowski |
| 2010/0023940 | A1 | 1/2010 | Iwamatsu et al. |
| 2010/0031274 | A1 | 2/2010 | Sim-Tang |
| 2010/0031325 | A1 | 2/2010 | Maigne et al. |
| 2010/0036925 | A1 | 2/2010 | Haffner |
| 2010/0064299 | A1 | 3/2010 | Kacin et al. |
| 2010/0070678 | A1 | 3/2010 | Zhang et al. |

(56) References Cited

U.S. PATENT DOCUMENTS

| | | |
|---|---|---|
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0010722 A1 | 1/2011 | Matsuyama |
| 2011/0029970 A1 | 2/2011 | Arasaratnam |
| 2011/0055378 A1 | 3/2011 | Ferris et al. |
| 2011/0055396 A1 | 3/2011 | DeHaan |
| 2011/0078679 A1 | 3/2011 | Bozek et al. |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0052258 A1 | 2/2015 | Johnson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0072727 A1 | 3/2016 | Leafe et al. |
| 2016/0092250 A1 | 3/2016 | Wagner et al. |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0140180 A1 | 5/2016 | Park et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |

(56) References Cited

U.S. PATENT DOCUMENTS

| | | |
|---|---|---|
| 2016/0301739 A1 | 10/2016 | Thompson |
| 2016/0364265 A1 | 12/2016 | Cao et al. |
| 2016/0371127 A1 | 12/2016 | Antony et al. |
| 2016/0378554 A1 | 12/2016 | Gummaraju et al. |
| 2017/0083381 A1 | 3/2017 | Cong et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0177391 A1 | 6/2017 | Wagner et al. |
| 2017/0177413 A1 | 6/2017 | Wisniewski et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0039506 A1 | 2/2018 | Wagner et al. |
| 2018/0121245 A1 | 5/2018 | Wagner et al. |

FOREIGN PATENT DOCUMENTS

| | | |
|---|---|---|
| JP | 2006-107599 A | 4/2006 |
| JP | 2011257847 A | 12/2011 |
| WO | WO 2008/114454 A1 | 9/2008 |
| WO | WO 2009/137567 A1 | 11/2009 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Adapter Pattern, Wikipedia, https://en.wikipedia.org/w/index.php?title=Adapter_pattern&oldid=654971255, [retrieved May 26, 2016], 6 pages.
Ben-Yehuda et al., "Deconstructing Amazon EC2 Spot Instance Pricing", ACM Transactions on Economics and Computation 1.3, 2013, 15 pages.
Czajkowski, G., and L. Daynes, Multitasking Without Compromise: A Virtual Machine Evolution 47(4a):60-73, ACM SIGPLAN Notices—Supplemental Issue, Apr. 2012.
Dombrowski, M., et al., Dynamic Monitor Allocation in the Java Virtual Machine, JTRES '13, Oct. 9-11, 2013, pp. 30-37.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Hoffman, Auto scaling your website with Amazon Web Services (AWS)—Part 2, Cardinalpath, Sep. 2015, 15 pages.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Shim (computing), Wikipedia, https://en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Zheng, C., and D. Thain, Integrating Containers into Workflows: A Case Study Using Makeflow, Work Queue, and Docker, VTDC '151 Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017
International Search Report and Written Opinion in PCT/US2015/052838 dated Dec. 18, 2015.
International Preliminary Report on Patentability in PCT/US2015/052838 dated Apr. 4, 2017.
International Search Report and Written Opinion in PCT/US2015/052833 dated Jan. 13, 2016.
International Preliminary Report on Patentability in PCT/US2015/052833 dated Apr. 4, 2017.
International Search Report and Written Opinidn in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
International Search Report and Written Opinion in PCT/US2016/066997 dated Mar. 20, 2017.
International Search Report and Written Opinion in PCT/US/2017/023564 dated Jun. 6, 2017.
Amazon, "AWS Lambda: Developer Guide", Retrieved from the Internet, Jun. 26, 2016, URL : http://docs.aws.amazon.com/lambda/latest/dg/lambda-dg.pdf.
Balazinska et al., Moirae: History-Enhanced Monitoring, Published: 2007, 12 pages.
Das et al., Adaptive Stream Processing using Dynamic Batch Sizing, 2014, 13 pages.
Yue et al., AC 2012-4107: Using Amazon EC2 in Computer and Network Security Lab Exercises: Design, Results, and Analysis, 2012, American Society for Engineering Education 2012.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Search Report and Written Opinion in PCT/US2017/040054 dated Sep. 21, 2017.
International Search Report and Written Opinion in PCT/US2017/039514 dated Oct. 10, 2017.

* cited by examiner

PROCESSING EVENT MESSAGES FOR USER REQUESTS TO EXECUTE PROGRAM CODE

RELATED APPLICATIONS

This application is a continuation of U.S. application Ser. No. 14/869,886, filed Sep. 29, 2015 and titled "PROCESSING EVENT MESSAGES FOR USER REQUESTS TO EXECUTE PROGRAM CODE," which is a continuation of U.S. application Ser. No. 14/502,741, filed Sep. 30, 2014 and titled "PROCESSING EVENT MESSAGES FOR USER REQUESTS TO EXECUTE PROGRAM CODE," the disclosure of each of which is hereby incorporated by reference in its entirety.

The present application's Applicant previously filed the following U.S. patent applications on Sep. 30, 2014, the disclosures of which are hereby incorporated by reference in their entireties:

| Application No. | Title |
| --- | --- |
| 14/502,589 | MESSAGE-BASED COMPUTATION REQUEST SCHEDULING |
| 14/502,810 | LOW LATENCY COMPUTATIONAL CAPACITY PROVISIONING |
| 14/502,714 | AUTOMATIC MANAGEMENT OF LOW LATENCY COMPUTATIONAL CAPACITY |
| 14/502,992 | THREADING AS A SERVICE |
| 14/502,648 | PROGRAMMATIC EVENT DETECTION AND MESSAGE GENERATION FOR REQUESTS TO EXECUTE PROGRAM CODE |
| 14/502,620 | DYNAMIC CODE DEPLOYMENT AND VERSIONING |

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Figure 1:
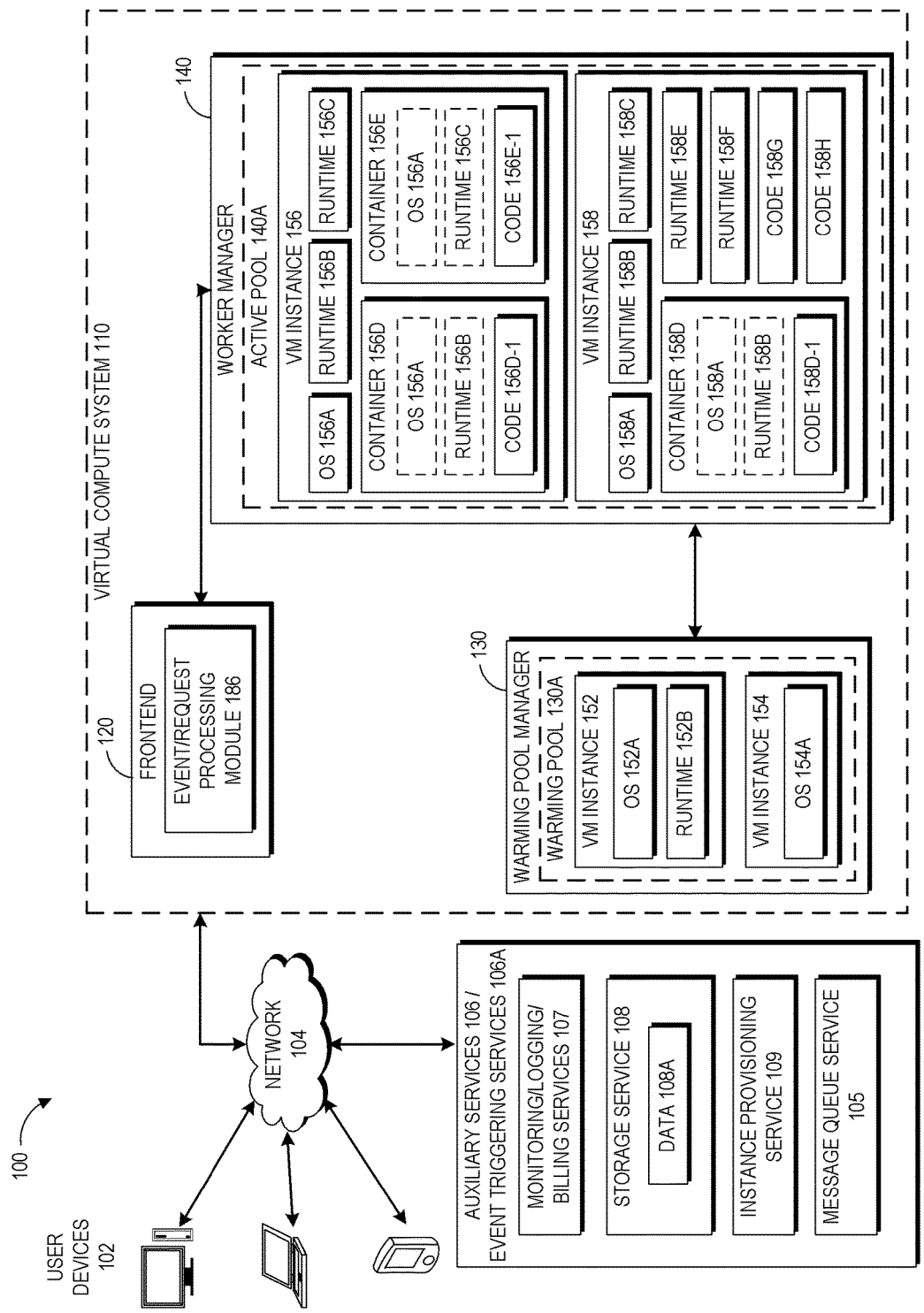
FIG. 1 is a block diagram depicting an illustrative environment for processing event messages for user requests to execute program codes in a virtual compute system.

Companies and organizations no longer need to acquire and manage their own data centers in order to perform computing operations (e.g., execute code, including threads, programs, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Thus, an improved method of allowing users to take advantage of the virtual machine instances provided by service providers is desired.

According to aspects of the present disclosure, by maintaining a pool of pre-initialized virtual machine instances that are ready for use as soon as a user request is received, delay (sometimes referred to as latency) associated with executing the user code (e.g., instance and language runtime startup time) can be significantly reduced.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. The virtual machine instances in the pool can be designated to service user requests to execute program codes. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In certain embodiments, a message queue, a message bus, or any other message intermediary service is provided to facilitate transportation or communication of event messages generated in a first programmatic environment (e.g., at an auxiliary service) to the programmatic environment provided by the virtual compute system described herein. To further facilitate propagation and transportation of a triggered event from the first programmatic environment to the virtual compute system, event messages may be generated to include information descriptive of the triggered event, a user associated with a request to execute user code in response to the triggered event, and programmatic information to enable the virtual compute system to convert the event message into a user request for further processing by the virtual compute system. The event message and/or programmatic information contained therein may be structured according to a schema, a code model, or an application programming interface ("API") to facilitate both creation/generation of the event message at the auxiliary service and conversion/processing of the event message at the virtual compute system.

In another aspect, a virtual compute system may maintain a pool of virtual machine instances on one or more physical computing devices, where each virtual machine instance has one or more software components loaded thereon. When the virtual compute system receives a request to execute the program code of a user, which specifies one or more computing constraints for executing the program code of the user, the virtual compute system may select a virtual machine instance for executing the program code of the user based on the one or more computing constraints specified by the request and cause the program code of the user to be executed on the selected virtual machine instance.

One benefit provided by the systems and methods described herein is an implicit and automatic rate matching and scaling between events being triggered on an auxiliary service and the corresponding execution of user code on various virtual machine instances. Thus, the virtual compute system is capable of responding to events on-demand, whether the events are triggered infrequently (e.g., once per day) or on a larger scale (e.g., hundreds or thousands per second).

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, and a worker manager 140. In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the virtual compute system 110 may comprise multiple frontends, multiple warming pool managers, and/or multiple worker managers. Although four virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as being connected to the network 104. In some embodiments, any of the components within the virtual compute system 110 can communicate with other components (e.g., the user computing devices 102 and auxiliary services 106, which may include monitoring/logging/billing services 107, a storage service 108, an instance provisioning service 109, a message queue service 105, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100A via the frontend 120. In some embodiments, any of the auxiliary services 106 may be configured to operate as an event triggering service 106A in order to listen for events specified by users of the auxiliary service and trigger generation of event messages for processing by the virtual compute system 110, as described in more detail herein. Thus for example, the storage service 108 may be configured to operate as an event triggering service 106A in order to provide the capability of executing user code on the virtual compute system 110 in response to events as they occur on the storage service 108.

In one embodiment, the one or more auxiliary services 106 may be registered or configured to be polled or queried for events to trigger execution of user codes on the virtual compute system 110. Such registration or configuration may be provided or enabled via the one or more user interfaces provided to the user computing devices 102. For example, a user interface may provide options for the user to select or specify an auxiliary service 106 as an event-triggering service 106A, such that events on the event-triggering service 106A may trigger generation of event messages, or such that the event-triggering service 106A may be periodically polled or queried for events such as by an intermediary polling system.

In one embodiment, the event triggering service 106A may be configured to associate an event or event type with a particular program code to be executed on the virtual compute system 110 (that is, the event triggering service 106A may store or have access to data which associates the event with the particular program code). In another embodiment, the event triggering service 106A may not necessarily associate an event or event type with a particular program code to be executed on the virtual compute system 110, but rather the event triggering service 106A may generate event messages which the virtual compute system 110 is configured to interpret as being associated with the program code to be executed on the virtual compute system 110 (that is, the virtual compute system 110 may store or have access to data which associates the event with the particular program code), In another embodiment, an intermediary system or service may be configured to handle interpretation and routing of event messages to execute the program code, such that neither the event triggering service 106A nor the virtual compute system 110 may store or have access to the event-to-program code association data. For example, the event triggering service 106A may generate an event message that is agnostic to any particular program code to be executed; and the event message may be routed to the virtual compute system 110 (or an intermediary system) which evaluates the event message and associated metadata to determine which program code to execute in response, and initiate a corresponding request to execute the program code.

As mentioned above, any of the auxiliary services 106 may be configured to operate as an event triggering service 106A. These include but are not limited to: remote storage systems; database systems; message queue systems (for example, a message queue service provided by the virtual compute system 110, a message queue system owned and/or operated by a user or client separate from the virtual compute system 110, and so on); web services; auditing services; health monitoring services (for example, for monitoring health status of a virtual compute system); logging services; billing services; resource management systems and services (for example, for managing lifecycles and/or ownership of virtual computing environments and the like); and so on.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 receives and processes all the requests (sometimes in the form of event messages) to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed.

The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may configured an auxiliary service 106 to operate as an event-triggering service 106A by registering the user code with the auxiliary service 106 and specifying that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. A timed or scheduled job may be implemented using the techniques of this disclosure to, for example, model the job as an event generated by a timer service. For example, the timer service may generate an event message indicating that it is now time to run a user code, and the virtual compute system 110 may implement a process to run code at a certain time by utilizing the timer service to remind the virtual compute system 110 to run the user code. In yet another example, the frontend 120 may include or have access to a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

In yet another example, the request may originate from another component within the virtual compute system 110 or other servers or services not illustrated in FIG. 1. In some embodiments, a request to execute/activate user codes may be generated in response to an event associated with the user computing device 102 or an auxiliary service 106. For example, in response to an end user uploading a new image from a user computing device to an auxiliary service (such as storage service 108) configured to operate as an event triggering service 106A, the event triggering service 106A can trigger a request to execute/activate a code to generate a thumbnail of the image. The code may be hosted in the active pool 120 or downloaded from a storage service storage service 108 to the virtual compute system 110.

In any of the examples described above and throughout this disclosure, an event message representative of a request to execute the user code may be initially received by a message queue service 105 and provided to or placed in a message queue. The message queue service 105 may be implemented as a component of the auxiliary services 106 or as a different component. In certain embodiments the frontend 120 may periodically poll the message queue service 105 to identify and retrieve event messages for processing. Message events may be placed in the message queue for example by the message queue service 105, such as in response to when an event is detected for which the user has registered to trigger automatic generation of a request to execute user code. In some instances it may be desirable or more practical to detect such events, trigger generation of an event message, and provide the event message to the message queue service 105. For example, depending on the embodiment, the message queue service 105 may be configured to allow ordering of message events so that certain message events may receive a higher priority. In another example, the message queue service 105 may be specifically or specially configured to facilitate transportation of certain types of programmatic events, such as database operations, certain types of data suitable for batch processing, and so on. In one embodiment the message queue service 105 may be configured to provide streaming, and/or ordered transport of messages (for example, as a sharded set of data). The frontend 120 may then poll the message queue service 105 and retrieve event messages for further processing by the virtual compute system 110.

In another embodiment, instead of or in combination with using the message queue service 105, the frontend 120 may query the event triggering service 106A directly to request and receive event messages for further processing, such as via invocation of an API provided by the event triggering service 106A. In another embodiment, the event triggering service 106A may interface directly with the frontend 120 via one or more APIs and function calls. For example, when an event is detected and an event message is generated, the event triggering system 106A may invoke an API provided by the frontend 120 to provide the event message directly to the frontend 120, without necessarily providing the event message to the message queue service 105.

A user request may specify one or more third-party libraries (including native libraries) to be used along with the user code. In one embodiment, the user request includes a package file (for example, a compressed file, a ZIP file, a RAR file, etc.) containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests and/or event messages to the multiple frontends 120, for example, in a round-robin fashion.

The warming pool manager 130 ensures that virtual machine instances are ready to be used by the worker manager 140 when the virtual compute system 110 receives a request to execute user code on the virtual compute system 110. In the example illustrated in FIG. 1, the warming pol manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A prior to receiving a code execution request that will be executed on the virtual machine instance. In other embodiments, the warming pool manager 130 communicates with an auxiliary virtual machine instance service (e.g., an instance provisioning service 109) to create and add new instances to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 1, instances may have operating systems (OS), language runtimes, and containers. The containers may have individual copies of the OS and the runtimes and user codes loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, user codes are executed in isolated compute systems referred to as containers (e.g., containers 156D, 156E, 158D). Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

Once a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156D-1 shown in the container 156D), the worker manager 140 may assign the container to the request and cause the user code to be executed in the container. Alternatively, if the user code is available in the local cache of one of the virtual machine instances (e.g., codes 158G, 158H, which are stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the virtual compute system 110 may maintain a separate cache in which user codes are stored to serve as an intermediate level of caching system between the local cache of the virtual machine instances and a web-based network storage (e.g., accessible via the network 104). The various scenarios that the worker manager 140 may encounter in servicing the request are described in greater detail below with reference to FIG. 4.

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). Another time period can be determined as the difference in time between (1) detection of an event on an event-triggering service and (2a) receiving a request to execute the user code (e.g., received by a frontend) and/or (2b) initiating execution of the user code (e.g., in a container on a virtual machine instance associated with the user). Another time period can be determined as the difference in time between (1) retrieving, accessing, or receiving an event message (e.g., directly or indirectly from on an event-triggering service) and (2) initiating processing of a request to execute the user code (e.g., in a container on a virtual machine instance associated with the user). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The worker manager 140 may include an instance allocation unit for finding compute capacity (e.g., containers) to service incoming code execution requests and a user code execution module for facilitating the execution of user codes on those containers. An example configuration of the frontend 120 is described in greater detail below with reference to FIG. 2.

Figure 2:
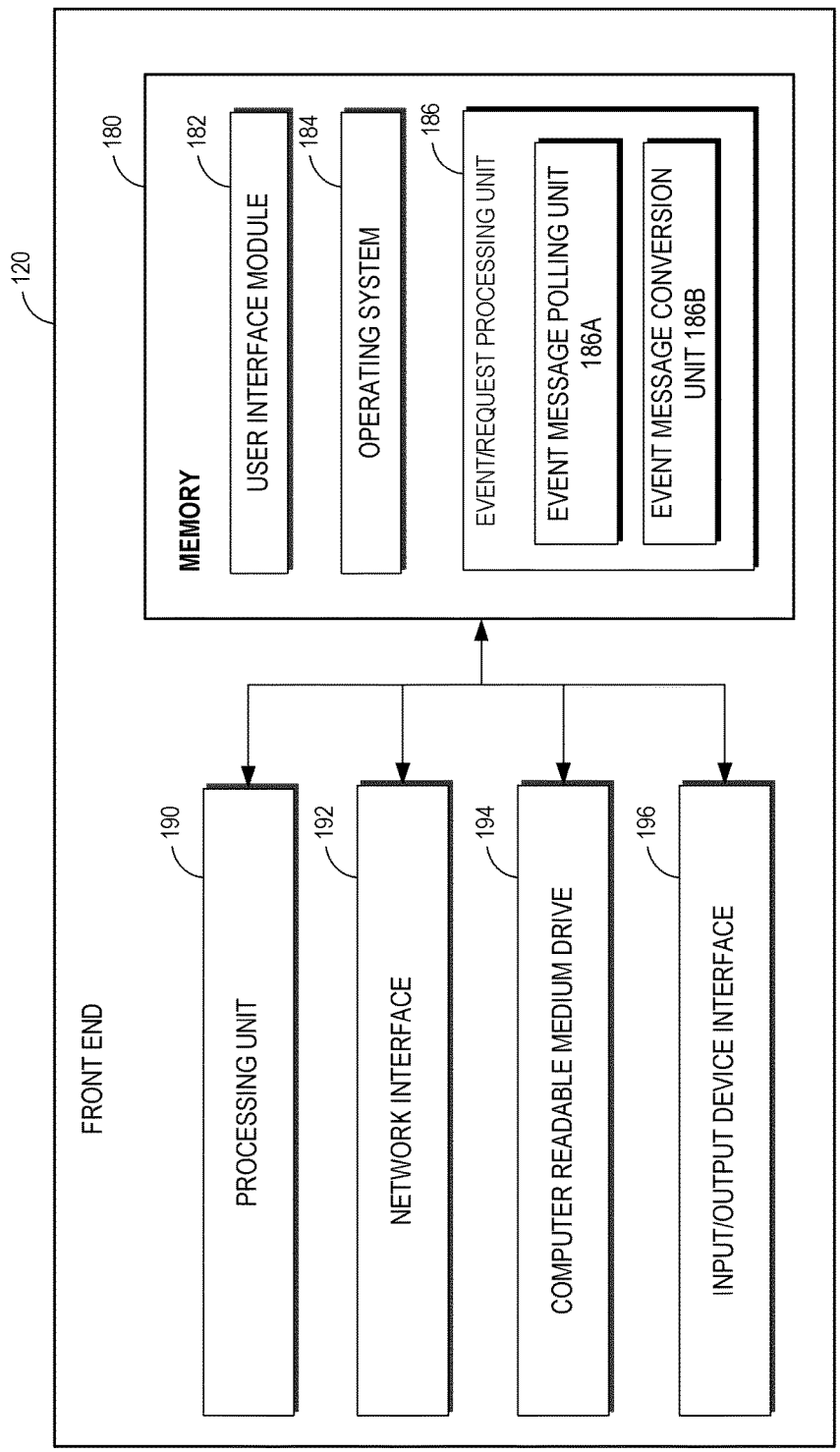
FIG. 2 depicts a general architecture of a computing device providing a frontend of a virtual compute system for processing event messages for user requests to execute program codes.

FIG. 2 depicts a general architecture of a computing system (referenced as frontend 120) that processes event messages for user requests to execute program codes in the virtual compute system 110. The general architecture of the frontend 120 depicted in FIG. 2 includes an arrangement of computer hardware and software modules that may be used to implement aspects of the present disclosure. The hardware modules may be implemented with physical electronic devices, as discussed in greater detail below. The frontend 120 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the frontend 120 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an event/request processing unit 188 which may include an event message polling unit 186A and an event message conversion unit 186B that may be executed by the processing unit 190. In one embodiment, the user interface unit 182, the event message polling unit 186A, and the event message conversion unit 186B individually or collectively implement various aspects of the present disclosure, e.g., processing an event message for a request to executed user code, as described herein. In another embodiment, a separate polling service may be implemented, for example via a polling fleet configured to poll an event source or a message queue and perform at least an initial message conversion or processing to prepare the event message for further processing by the frontend 120 and/or another component of the virtual compute system 100.

The event message polling unit 186A periodically polls for event messages to be processed into requests to execute user code. For example, the event message polling unit 186A may periodically access a message queue, such as the message queue service 105 or any other message queue service or message bus, to determine or detect whether an event message has been placed in the message queue for processing by the virtual compute system 110. An event message may be placed in the message queue according to, for example, the routine described herein with reference to FIG. 3. In response to determining or detecting an event message in the message queue, the event message polling unit 186A may retrieve the message event from the message queue and initiate further processing of the event message as further described herein. In another embodiment, the event message polling unit 186A may poll the event-triggering service 106A directly rather than from a message queue. For example, some event-triggering services such as certain types of databases may support direct polling of event messages that need not necessarily rely on an intermediary message queue.

The event message conversion unit 186B manages the conversion of the event message (e.g., as accessed or retrieved from a message queue such as the message queue 105) into a request to execute user code (e.g., ready for further processing in accordance with the processes described in U.S. application Ser. No. 14/502,992, titled "THREADING AS A SERVICE," filed on Sep. 30, 2014, which was previously incorporated by reference in its entirety above). Conversion of the event message is described in more detail with reference to FIG. 4 herein. In one embodiment the event message is generated in a format representative of a remote procedure call to facilitate rapid conversion and/or immediate function invocation by the virtual compute system 110 when the event message is processed. Such an implementation enables a high degree of functional transparency and reduced latency between an auxiliary system responding to an event trigger and the virtual compute system 110 processing the event message generated by the auxiliary system responsive to the event trigger.

While the event message polling unit 186A and the event message conversion unit 186B are shown in FIG. 2 as part of the frontend 120, in other embodiments, all or a portion of the event message polling unit 186A and the event message conversion unit 186B may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the frontend 120. In some embodiments, the frontend 120 may further include components other than those illustrated in FIG. 2.

Figure 3:
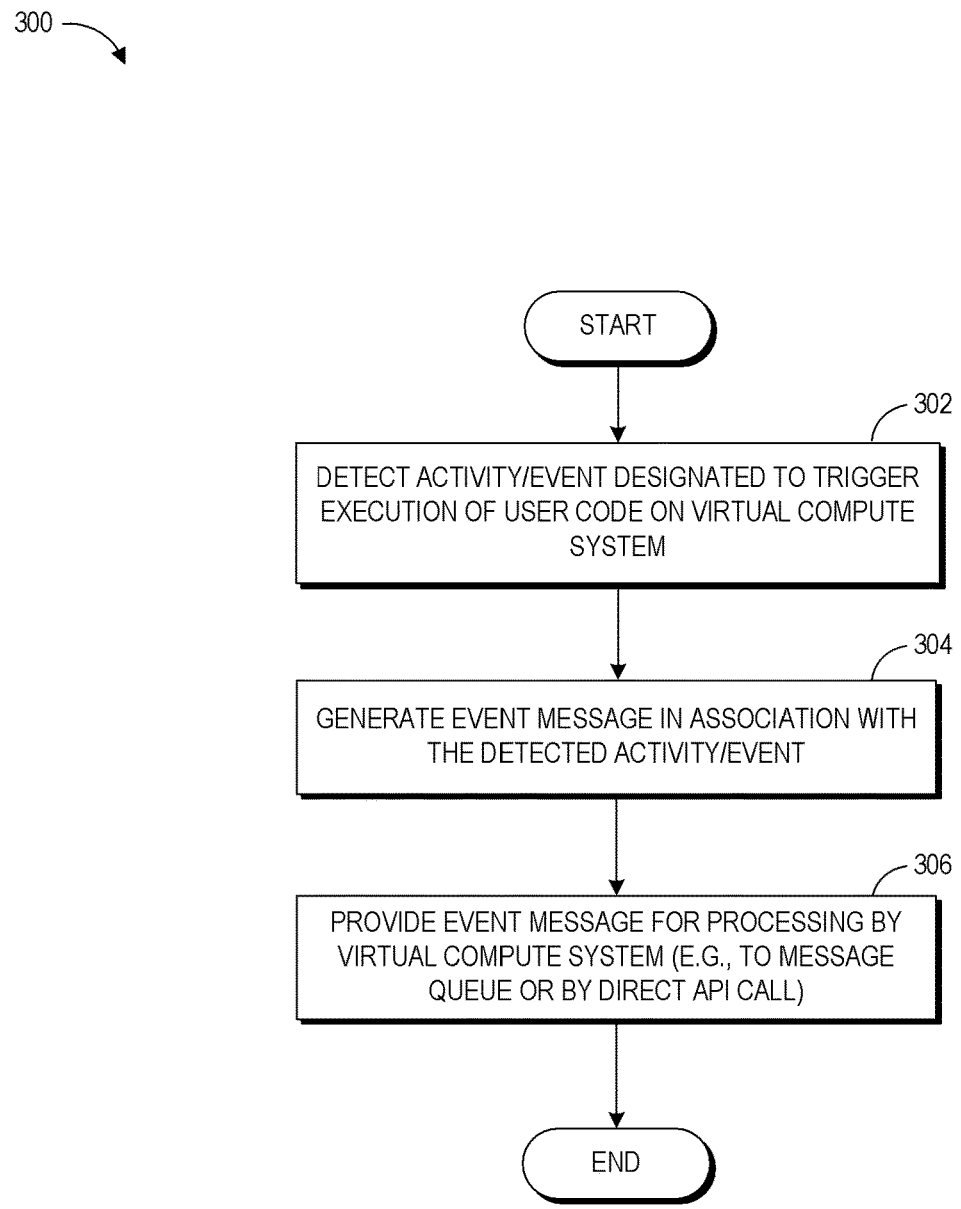
FIG. 3 is a flow diagram illustrating an event notification and message generation routine implemented by an auxiliary system in communication with a frontend of a virtual compute system, according to an example aspect.

Turning now to FIG. 3, a routine 300 implemented by one or more components of the auxiliary service 106, such as the storage service 108, configured to operate as an event triggering service 106A, will be described. Although routine 300 is described with regard to implementation by event triggering service 106A, one skilled in the relevant art will appreciate that alternative components, such as a user device 102 or the virtual compute system 110, may implement routine 300 or that one or more of the blocks may be implemented by a different component or in a distributed manner.

At block 302 of the illustrative routine 300, the event triggering service 106A detects an event or activity that has been designated to trigger or activate execution of a user code on the virtual compute system 110. For example, in some embodiments the event triggering service 106A may be configured to enable or activate event notifications for one or more events. In one embodiment the event trigger and notification configuration settings may be provided or specified by a user. For example, when the user provides or uploads user code to the virtual compute system 110 and/or to the storage service 108, the user may at that time specify one or more events for which the event triggering service 106A should listen, and which corresponding functions or routines of the user code are to be executed in response to detection of the one or more events. As one illustrative example, a user may upload (or have previously uploaded or otherwise provided to the virtual compute system 110) a user code to generate a thumbnail image, and further specify that the code to generate a thumbnail image is to be executed in response to an end user uploading a new image to an auxiliary system (such as an image sharing system). In this example the image sharing system will then monitor or detect an image upload event. In some embodiments the event trigger and notification configuration settings may be provided or specified by a configuration file or other data format that may be provided, for example, with the user code. In various embodiments, the user uploading the user code and the end user performing some other action with respect to the auxiliary service configured as an event-triggering service (such as uploading a new image) may be separate and distinct users or entities.

Next, at block 304, the event triggering service 106A generates an event message in association with the detected activity/event. For example, the event triggering service 106A may generate the event message according to the event trigger and notification configuration settings previously provided by the user. The configuration settings can specify, for example, a schema, a code model, or an API associated with the user code to be executed by the virtual compute system in response to the event being triggered. For example the event message may be generated to comprise, among other things, a user account identifier associated with the user, a function identifier to identify a function to be invoked on the virtual compute system, and one or more event message parameters including any input parameters (required and/or optional) to be provided with the function invocation.

In some embodiments, the event message may include data or metadata that indicates the program code to be executed, the language in which the program code is written, the user associated with the request, and/or the computing resources (e.g., memory, etc.) to be reserved for executing the program code. For example, the event message may specify that the user code is to be executed on "Operating System A" using "Language Runtime X." When the event message is processed by the virtual compute system 110 (see, e.g., FIG. 4), the virtual compute system 110 or one of its components may locate a virtual machine instance that has been pre-configured with "Operating System A" and "Language Runtime X" and assigned to the user. The virtual compute system 110 may then create a container on the virtual machine instance for executing the user code therein. If a container having the code already exists on the virtual machine instance, the virtual compute system 110 can buffer the current request for execution on the container once the container becomes available.

In one embodiment the format of the event message (or at least a portion of the event message) may represent a standard remote procedure call such that the event triggering service 106A may only need to perform minimal processing to provide relevant information in the event message that may be needed to invoke the function on the virtual compute system. For example, such a standard remote procedure call format may enable an auxiliary system 106 which runs a different operating system or language runtime than the virtual compute system 110 to seamlessly communicate with the virtual compute system 110 via the event message generated in such a standard format. In one embodiment the format of the remote procedure call may be provided by the user and designed to match or correspond to the user code to be executed. For example, when an image upload event is detected, the format of the event message may represent a remote procedure call to a function to be executed in response on the virtual compute system, such as "invoke (generateThumbnail, userID, imageName, imagePath)", or "generateThumbnail (userID, imageName, imagePath)," or similar.

In some embodiments, such as certain instances where a trusted or secure relationship is established between the event triggering service 106A and the virtual compute system 110, the event message may further comprise the user code to be executed by the virtual compute system 110. For example, the user may provide the user code to the event triggering service 106A instead of or in addition to providing the user code to the virtual compute system 110, and further designate that the user code is to be provided with the event message to the virtual compute system 110 for execution at runtime. In another embodiment, the event message may comprise a location (such as a URI) of the user code to be executed by the virtual compute system 110, such that the virtual compute system 110 can remotely invoke the user code via the URI.

At block 306, the event triggering service 106A provides the event message for further processing by the virtual compute system. For example, in one embodiment the event message is provided to a message queue, such as the message queue 105. The message queue service 105 may be a component of the auxiliary system 106 (e.g., as shown in FIG. 1) or it may be a separate system or service in communication with the auxiliary system 106 and/or the virtual compute system 110 over the network 160. The particular format of the event message may be based at least in part on a specification associated with the message queue being used to transport the event message. Additionally, a particular message queue being used may be based on the type of event message being generated and provided to the virtual compute system. For example, a particular message queue may be suited to transport messages relating to database operations, and thus an event message generated in response to a database event trigger may be provided using the particular message queue. How the virtual compute system accesses and processes the event message is described in greater detail below with reference to FIG. 4. In another embodiment, the event message may be provided or made available for access by the virtual compute system 110 directly, without the need for an intermediary message queue. For example, the event triggering service 106A may provide or enable an API which the virtual compute system 110 may invoke in order to request one or more available event messages from the event triggering service 106A. The virtual compute system 100 may then invoke the API, for example on a periodic basis, instead of or in combination with polling a message queue in order to access and/or retrieve event messages for processing.

While the routine 300 of FIG. 3 has been described above with reference to blocks 302-306, the embodiments described herein are not limited as such, and one or more blocks may be omitted, modified, or switched without departing from the spirit of the present disclosure.

Figure 4:
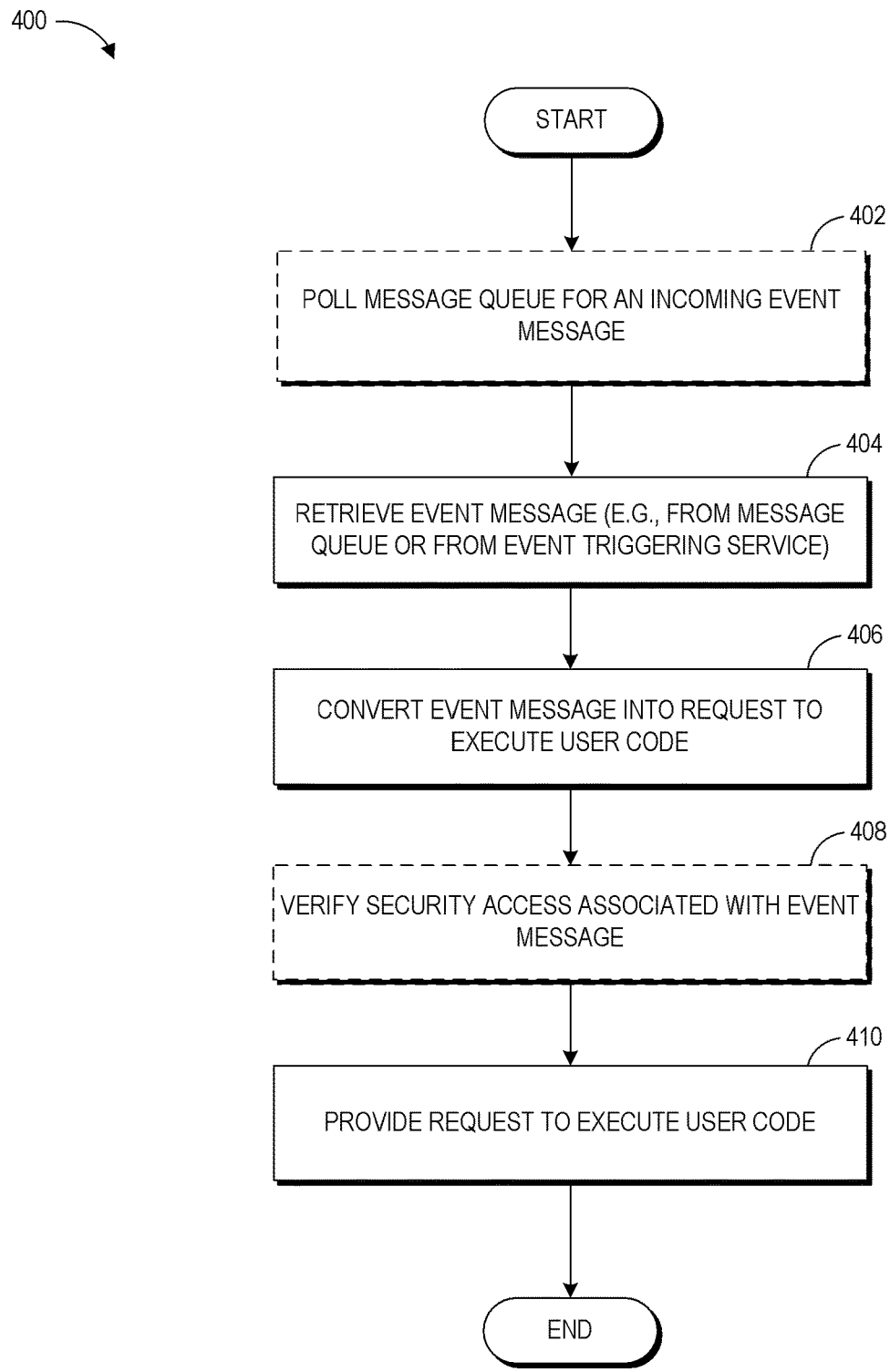
FIG. 4 is a flow diagram illustrating an event message processing routine implemented by a frontend of a virtual compute system, according to another example aspect.

Turning now to FIG. 4, a routine 400 implemented by one or more components of the virtual compute system 110 (e.g., the frontend 120) will be described. Although routine 400 is described with regard to implementation by the frontend 120, one skilled in the relevant art will appreciate that alternative components may implement routine 400 or that one or more of the blocks may be implemented by a different component or in a distributed manner.

At block 402 of the illustrative routine 400, the frontend 120 may optionally periodically poll a message queue (e.g., message queue 105) for an event message which may represent a request to execute user code. For example, the block 402 may continue the event messaging process from the block 306 of FIG. 3 in scenarios where the event triggering service 106A provides event messages via the message queue.

Next, at block 404, the frontend 120 accesses or retrieves an event message for processing by the virtual compute system 110. In one embodiment, the event message is accessed or retrieved from the message queue. Retrieval of the event message removes the event message from the message queue to prevent duplication of further processing associated with the event. In another embodiment, the event message may be accessed or retrieved from the event triggering service directly, such as by invocation of an API provided by the event trigger service by which the frontend 120 can request and receive event messages ready for processing by the virtual compute system 110. The event message can include or comprise any of the information and metadata described above with reference to FIG. 3, including for example, a user account identifier associated with the user, a function identifier to identify a function to be invoked on the virtual compute system, and one or more event message parameters including any input parameters (required and/or optional) to be provided with the function invocation.

At block 406, the frontend 120 converts the event message into a request to execute user code, such that the request to execute user code may be further processed by the virtual compute system 110 (including, for example, as described in U.S. application Ser. No. 14/502,992, titled "THREADING AS A SERVICE," filed on Sep. 30, 2014, which was previously incorporated by reference in its entirety above). Conversion of the event message may involve parsing the event message to identify and/or extract the function identifier, any input parameters, and other metadata that may be needed to generate a request to execute the user code which was designated by the user to be executed in response to the event trigger. For example, the event message may include or comprise at least one or more of the following: information related to an event payload (e.g., event data), which may conform to a known or defined schema or other format; an event wrapper or "envelope" provided, for example, by the event message bus or by the event-triggering service (for example, which may part of an implicit lease on the event message provided by the message queue service); and/or event metadata associated with the event, including an identity for which the event message was signed, an identity of the event producer or source of the event trigger (for example, which event-triggering service triggered the event), a name or owner of the message queue on which the event message was transported; and so on.

As described with reference to FIG. 3, in one embodiment the format of the event message may represent a standard remote procedure call, such that once retrieved from the message queue, the frontend 120 may only need to perform minimal processing to generate a corresponding request to execute the user code. For example, when an image upload event is detected, the format of the event message may represent a remote procedure call to a function to be executed in response on the virtual compute system, such as "invoke (generateThumbnail, userID, imageName, imagePath)", or "generateThumbnail (userID, imageName, imagePath)," or similar. Thus, in one embodiment, the frontend 120 may extract this remote procedure call and immediately invoke the specified function to initiate a request. Further, as discussed above with reference to FIG. 3, the request to execute the user code may further specify that the user code is to be executed on "Operating System A" using "Language Runtime X," which may be included as additional inputs for the request to execute the user code.

At block 408, the frontend 120 may optionally verify security access and/or authenticate the user associated with a user account identifier provided with the event message and determine that the user is authorized to access the specified user code. In some embodiments the security and/or authentication may be omitted or performed in a separate process or as part of the processing of the request to execute the user code. In some embodiments the security and/or authentication may be performed earlier in the routine 400, such as prior to the conversion performed at block 406.

At block 410, the frontend 120 provides the request to execute the user code to the virtual compute system 110. In certain embodiments the frontend 120 itself may perform further processing of the request, for example as described in U.S. application Ser. No. 14/502,992, titled "THREADING AS A SERVICE," filed on Sep. 30, 2014, which was previously incorporated by reference in its entirety above. The request can include a program code composed in a programming language. Various program languages including Java, PHP, C++, Python, etc. can be used to compose the user code. The request can include configuration information relating to code-execution requirements. For example, the request can include information about program language in which the program code is written, information about language runtime and/or language library to execute the user code. The configuration information need not include any specific information regarding the virtual machine instance that can host the user code.

While the routine 400 of FIG. 4 has been described above with reference to blocks 402-410, the embodiments described herein are not limited as such, and one or more blocks may be omitted, modified, or switched without departing from the spirit of the present disclosure. For example, the block 402 may be modified such that the frontend 120 receives an event message from the user device 102.

The routine 400 of FIG. 4 may include different processes or routines which may be performed in a different order. One alternative example is provided as follows, although other variations may be possible. First, an event message may be received or accessed by the frontend 120, which parses the event message (using a schema if one is available). The frontend 120 may combine the parsed event message with additional event metadata (e.g., an event wrapper, information about the message queue identity or source of the event trigger, and so on) in order to determine or establish information about the event, the source or owner of the event, and other information which may be provided to the virtual compute system 110. The frontend 120 may then perform at least an initial authorization and/or security check as needed to verify secured access and related execution of user code. The frontend 120 may then evaluate the parsed event message and additional event metadata in order to route the message to an appropriate program or user code to be called in response to the event. The frontend 120 may then perform mapping of the event message into a request to execute the user code by, for example, converting the content of the message and/or the event metadata into arguments, variables, and other inputs in the programming language of the user code selected to process the event message. Additional information may be added to the request to execute the user code including, for example, an identity associated with the signer or provider of the event message. The frontend 120 may then call a function, method, or other entry point in the programming language (optionally with conditions based on aspects of the event message and/or event metadata) to initiate processing of the request.

During processing of the request to execute user code the frontend 120 may continue to perform additional processes to facilitate processing of the event message or payload. For example, if the original event message or payload comprised an aggregate collection of one or more sub-events, each sub-event may be relayed to the virtual compute system 110 for execution via the user code one at a time. The frontend 120 may be configured to manage splitting the original, aggregate event message payload into multiple single events. The frontend 120 may also be configured to, for example, facilitate intermediate or aggregate checkpoint services which may be required as part of processing of the original event message. For example, an aggregate event message comprising multiple events may require some of first events to be processed and completed first before later, second or tertiary events; in this case the frontend 120 may be further configured to facilitate processing of the first events, check for status of completion of the first events before routing the later, second or tertiary events for processing/execution by the virtual compute system.

After processing/execution of the user code for an event message, the frontend 120 may be further configured to provide additional post-processing. For example, the frontend 120 may perform certain cleanup operations (for example, releasing a lease on the associated event message/wrapper), perform result calculations, provide return values (if needed), perform checkpoint operations (which, for example, as described above, may occur during processing or in between processing of sub-events related to an aggregate event message), and so on. In some embodiments, the frontend 120 may perform logging, monitoring, alarming/notifications, and/or other reporting associated with the completion (successful or unsuccessful) of the event on behalf of the user program. In some cases such logging, monitoring, and so on may be performed in addition to any logging, monitoring, and related processes performed during execution of the user code itself. For example, the frontend 120 may be configured to report on the outcome of the event (and related execution of user code in response to the event), for example back to the event-triggering service 106A or to the user.

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable storage medium and loaded into memory of the computing device using a drive mechanism associated with a computer readable storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for processing event messages to cause execution of program codes on one or more virtual machine instances, the system comprising:
    a front end computing system comprising one or more hardware computing devices executing specific computer-executable instructions, said front end computing system in communication with (i) a message queue system configured to store event messages and (ii) a virtual compute system configured to execute program codes, the front end computing system configured to at least:
        retrieve, from the message queue system, a first event message including event data relating to a first triggering event;
        identify, based on the event data included in the first event message, (i) a first program code to be executed by the virtual compute system and (ii) one or more input parameters to the first program code; and
        cause the virtual compute system to execute the first program code using the one or more input parameters.

2. The system of claim 1, wherein the first triggering event comprises a data file being uploaded to a remote storage system in communication with the message queue system.

3. The system of claim 1, wherein the first triggering event comprises a database table being updated in a database system in communication with the message queue system.

4. The system of claim 1, wherein the event data comprises one or more of (i) a user account identifier identifying a user account associated with the first program code, (ii) a program code identifier associated with the first program code, and (iii) one or more input parameter identifiers identifying the one or more input parameters to the first program code.

5. The system of claim 1, wherein the message queue system is separate and distinct from the virtual compute system.

6. The system of claim 1, wherein the event data is indicative of one or more of (i) an operating system on which the first program code is to be executed and (ii) a program language in which the first program code is written.

7. A computer-implemented method for executing program codes in response to triggering events comprising:
    as implemented by one or more computing devices configured with specific executable instructions,
        receiving an event message including event data relating to a first triggering event;
        identifying, based on the event data included in the event message, (i) a first program code to be executed by a virtual compute system configured to execute program codes on one or more virtual machine instances and (ii) one or more input parameters to the first program code, the first program code configured to be executed in response to an occurrence of the first triggering event;
        identifying a virtual machine instance to be used to execute the first program code; and
        executing the first program code on the virtual machine instance using the one or more input parameters.

8. The computer-implemented method of claim 7, wherein the event message includes one or more of (i) a user account identifier identifying a user account associated with the first program code, (ii) a program code identifier associated with the first program code, and (iii) one or more input parameter identifiers identifying the one or more input parameters to the first program code.

9. The computer-implemented method of claim 7, wherein the event message includes an indication that the event message was generated in response to the occurrence of the first triggering event.

10. The computer-implemented method of claim 7, wherein the event message includes an indication of an event source environment in which the first triggering event occurred.

11. The computer-implemented method of claim 7, wherein the first triggering event comprises a first file being uploaded onto a file storage system configured to store data files, wherein the first program code is configured to generate a second file based on a content of the first file.

12. The computer-implemented method of claim 7, wherein the first triggering event comprises a first file being uploaded onto a file storage system configured to store data files, wherein the virtual compute system is further configured to execute the first program code with the first file as an input to the first program code.

13. The computer-implemented method of claim 7, wherein the virtual compute system is further configured to identify the first program code based on a mapping configured to map a given event message to one or more of a plurality of program codes.

14. The computer-implemented method of claim 7, wherein the event message is an aggregate event message associated with multiple program codes, wherein the virtual compute system is further configured to determine, prior to causing one or more second ones of the multiple program codes to be execute, that a first one of the multiple program codes has finished executing, wherein the first one of the multiple program codes is different from any of the one or more second ones of the multiple program codes.

15. The computer-implemented method of claim 7, further comprising receiving the event message from an event source that is provided by a computing system separate and distinct from the virtual compute system.

16. The computer-implemented method of claim 7, further comprising causing the first program code to be executed inside a container created on the virtual machine instance assigned to a user account associated with the first program code.

17. Non-transitory physical computer storage comprising computer executable instructions that, when executed by one or more hardware processors, configure the one or more hardware processors to:
 access an event message including event data relating to a triggering event;
 identify, based on the event data included in the event message, (i) a first program code to be executed by a virtual compute system configured to execute program codes on one or more virtual machine instances and (ii) one or more input parameters to the first program code;
 identify a virtual machine instance on which to execute the first program code; and
 cause the first program code to be executed on the virtual machine instance using the one or more input parameters.

18. The non-transitory physical computer storage of claim 17, wherein the computer executable instructions further cause the one or more hardware processors to access the event message at an auxiliary service configured to store event messages generated in response to respective triggering events, wherein the auxiliary service is provided by a computing system that is separate and distinct from the virtual compute system.

19. The non-transitory physical computer storage of claim 17, wherein the event data is indicative of one or more of (i) an operating system on which the first program code is to be executed and (ii) a program language in which the first program code is written.

20. The computer-readable, non-transitory storage medium of claim 17, wherein the computer executable instructions further cause the one or more hardware processors to cause the first program code to be executed inside a container created on the virtual machine instance assigned to a user account associated with the first program code.

* * * * *